Patented Feb. 23, 1943

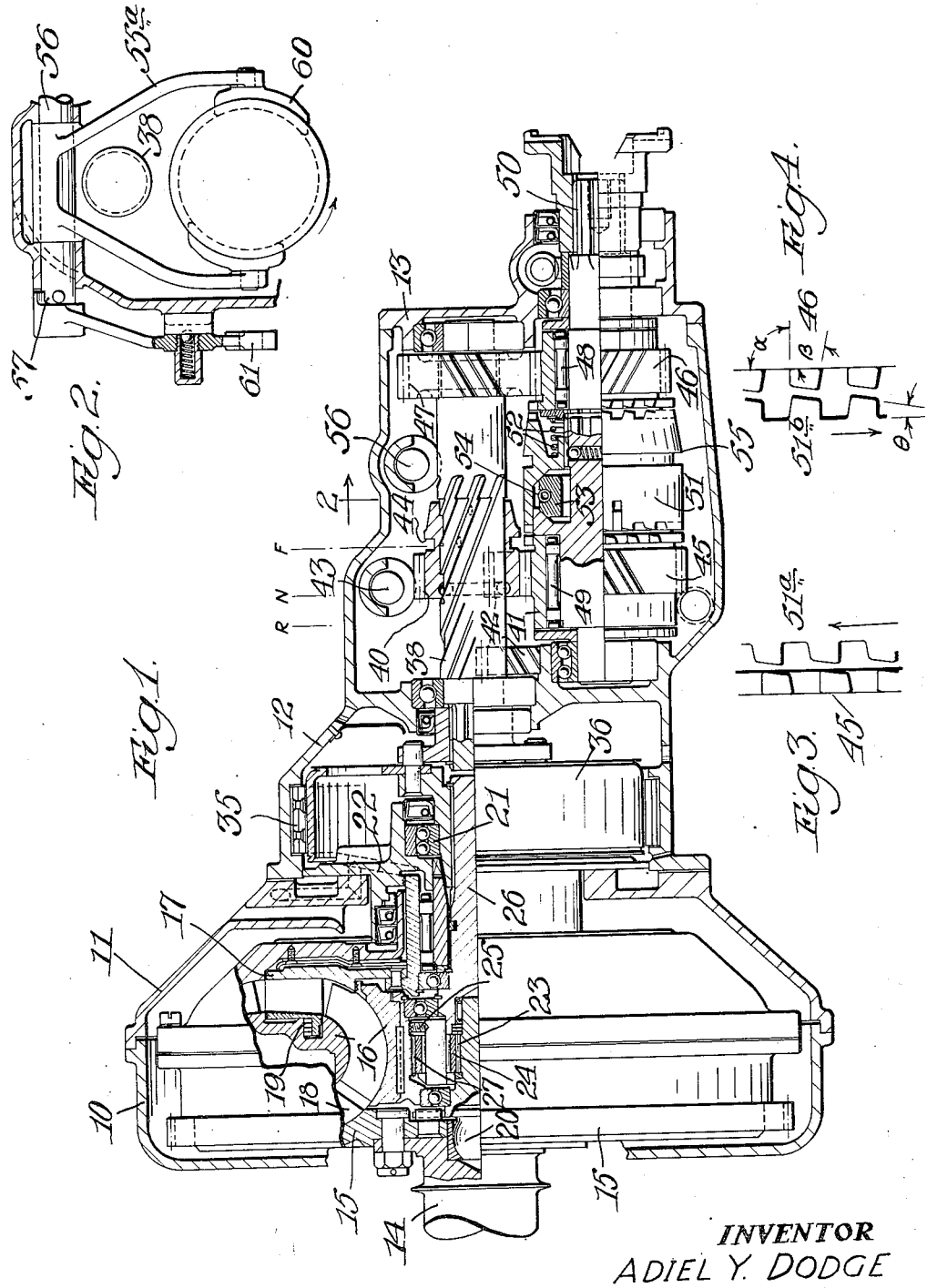

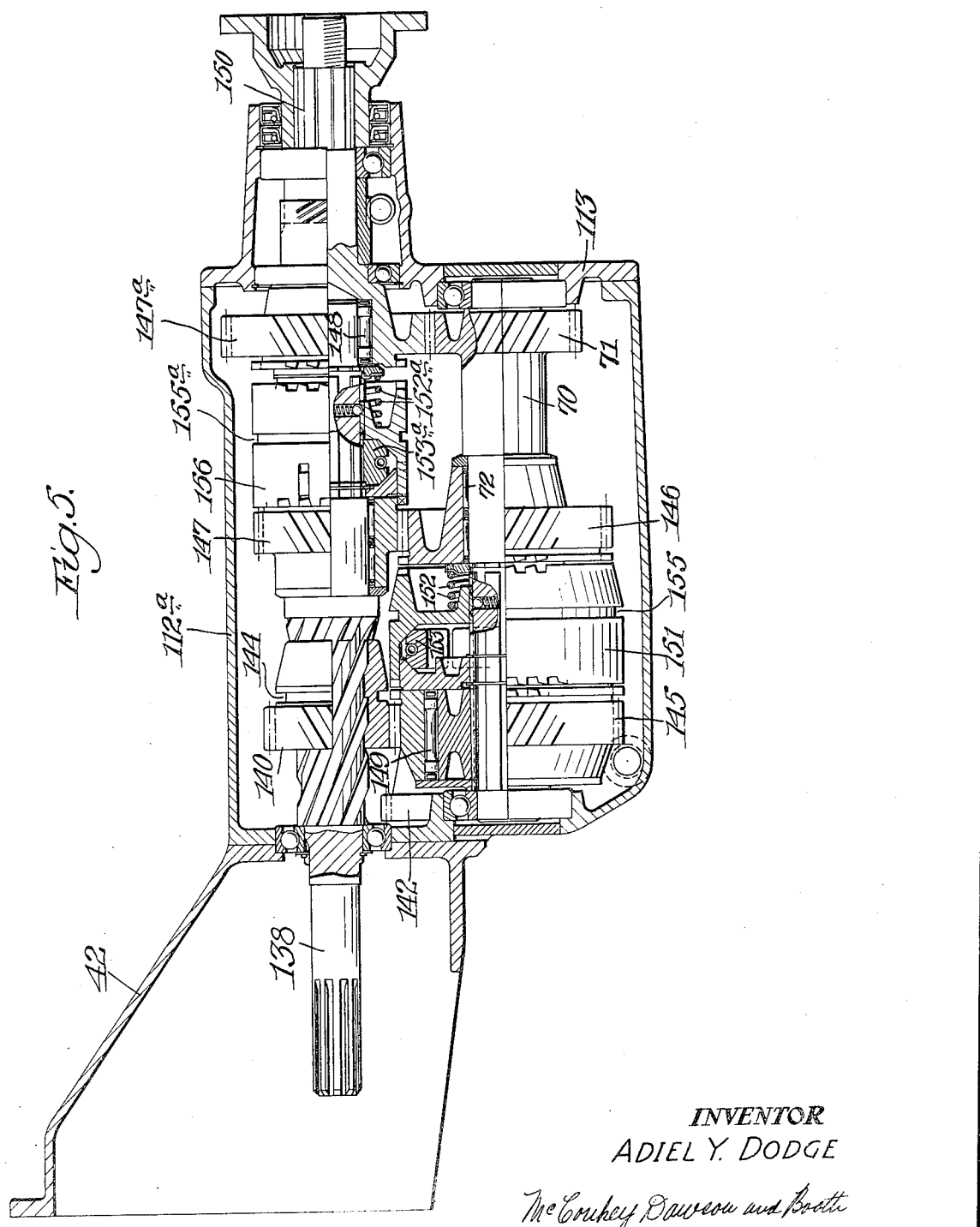

2,311,740

UNITED STATES PATENT OFFICE 2,311,740

TRANSMISSION

Adiel Y. Dodge, Rockford, Ill.

Application October 7, 1938, Serial No. 233,844

8 Claims. (Cl. 74—336)

This invention relates to transmissions and more particularly to automatically shiftable transmissions for automobiles or the like.

One of the objects of the invention is to provide a transmission in which synchronization of shiftable mating parts is assured at the time of shifting. According to one important feature of the invention synchronization is effected by one way clutch connections between the mating parts and, if desired, by specially shaped mating surfaces.

Another object of the invention is to provide an automatically shiftable transmission which will insure safe driving connections between the driving and driven elements in the event of an incompleted shift.

Still another object is to provide an automatically shiftable transmission in which the shifting conditions may be changed manually at will.

A further object is to provide an automatic transmission including a hydraulic torque converter giving infinitely variable torque ranges in which the range is varied automatically. Preferably the torque converter is connected to an automatically shiftable gear unit which is shiftable in response to speed and torque conditions to shift the operating range of the transmission.

Other objects and advantages of the invention including novel subcombinations and structural features will be apparent from the following description of the accompanying drawings, in which:

Figure 1 is a vertical longitudinal section of a transmission embodying the invention;

Figure 2 is a fragmentary cross section on the line 2—2 of Figure 1;

Figures 3 and 4 are diagrammatic details of clutch teeth; and

Figure 5 is a longitudinal vertical section of a modified construction.

Referring more particularly to Figure 1 there is shown a stationary housing made up of parts 10, 11, 12 and 13, part 10, if desired, being the engine portion of conventional flywheel housing and being secured to the engine crank case, not shown. A suitable driving shaft 14 which may be the engine crank shaft is connected to a housing 15 forming a combined fly wheel and housing for a torque converter of the type more particularly described and claimed in my copending application Serial No. 57,520, filed January 4, 1936. The torque converter is completed by a vaned rotor 16 and a vaned stator 17 forming, with suitable vanes 18 in the impeller housing, a toroidal fluid circuit. A coiled type one way clutch as shown at 19 may be installed to prevent the stator from ever turning faster than the rotor, which might occur at speed ratios very near one to one. The coil 21 normally has clearance at its outer periphery between itself and the rotor shell, centrifugal force expands the coil when the stator turns, thus providing the excitation load.

Self-aligning bearings are provided at 20 and 21 and means for self-centering bearing housing 22 is provided, for the purpose of improving alignment of the several superimposed parts in spite of inaccuracies existing in the housing members.

The driving shaft 14 carries a sun gear 23 meshing with planet pinions 24 on a carrier 25 which is formed on or secured to a shaft 26. The pinions 24 also mesh with an annular gear 27 formed on the rotor 16 so that shaft 26 is driven jointly by the gears 23 and 27. This forms a two path driving connection between shafts 14 and 26 as more particularly described and claimed in my copending application Serial No. 723,083, filed April 30, 1934.

Preferably the gears 23, 24 and 27 are arranged to form a gear pump which is connected to circulate liquid through the torque converter and, if desired, through a cooling radiator or the like. It will be noted that the relative velocity of the gears is greatest when there is a high relative velocity between the impeller and rotor so that more liquid will be pumped through the converter at this time. This is desirable to produce a greater cooling of the liquid.

A rotor brake is provided so that the shaft 26 may be nearly stalled when shifting from neutral into forward or reverse as explained later, part 35 being a contracting band and 36 a drum going to make up said rotor brake.

A flexible connection 37 connects the shaft 26 to a splined shaft 38. A gear 40 splined on shaft 38 may be slid into engagement with gear 41 on an output shaft 50 as shown to give low range forward, or it may be slid into engagement with gear 42 on the shaft 50 to give a low speed reverse, or it may be slid halfway between to give neutral. Suitable detents may be located in the shaft and in the gear 40 as shown yieldingly to hold it in shifted position. The shifting of gear 40 may be done by a yoke, not shown, pivoted at 43. Lines R—N—F are reverse neutral and forward respectively and indicate the position of the center of shifting groove 44 in the gear 40 for the various positions.

During all forward speeds gear 40 meshes with gear 45 and gear 46 meshes with a gear 47 fixed on the shaft 38. During the lower speed range, gear 46 idles on a roller bearing 48. Since the device is capable of wide speed and torque ratios the output shaft 50 will be driven at such ratios modified only by the ratio of gear 40 to gear 45, thus giving an infinitely variable range of torques. Another and somewhat higher speed range of infinitely variable torques is available when gear 41 idles on bearing 49 and gear 47 drives gear 46. Whether gears 45 or 46 idle or drive depends on the position of a tooth clutch member 51 splined on the shaft 50.

If 51 is to the left it engages gear 45 causing 45 to drive shaft 50. Member 51 is normally held to the left by a spring 52, thus normally engaging the low speed range gears. When the speed has reached a predetermined rate weights 53 produce a centrifugal force sufficient to overcome spring 52, and shift clutch member 51 to the right; but not enough force to shift said member 51 while it is under torque load. In this way the mechanism is ready to shift after a predetermined rate of speed has been reached but awaiting permission to shift so to speak. As soon as the driver releases the accelerator the torque is relieved and the shift takes place; 51 shifts to the right engaging gear 46. Gear 47 turns gear 46 which turns clutch 51 which is splined to shaft 50. In this position the transmission is in the high speed lower torque infinitely variable range. When the speed has been reduced clutch member 51 will shift out of this range into the lower speed range upon the first torque reversal subsequent to the reduced speed.

The centrifugal weights 53 are in three pieces forming a ring. There is shown a garter spring 54 surrounding the ring of weights and set into a groove therein. This garter spring is a convenient means of holding the three weights together and supplements spring 52.

According to a further feature of the invention the roller bearing 49 is a combined roller bearing and one way clutch as fully set forth in my Patent No. 2,113,722 arranged to allow shaft 50 to turn faster than gear 41 but preventing gear 41 from turning faster than shaft 50. Because of this one way clutch the engine can drive the shaft 50 even though the tooth clutch member 51 is disengaged from both gears 45 and 46. Further than this it is impossible for gear 45 to turn faster than tooth clutch member 51 when 51 is approaching gear 45 for engagement. Hence there can be no lack of synchronization on the lower side.

Roller bearing 48 is combined with a similar one way clutch arranged to prevent shaft 50 from turning faster than gear 46. Since shifting of tooth clutch member 51 takes place upon torque reversal, shaft 50 will endeavor to overrun gear 46, this being prevented by the one way clutch. Gear 46 and tooth clutch 51 are turning together, therefore the teeth of 46 and 51 are in synchronization. It is true that in this case the teeth may not be lined up for engagement, but should they be one half tooth out of line, teeth of 46 will line up with those of 51 after a few degrees movement when 46 attempts to drive 51. Besides this it is impossible for shaft 50 to turn freely; i. e., it cannot turn faster than gear 46. Therefore should tooth clutch member 51 be in a mid position the engine can drive shaft 50 in the lower speed range and the shaft 50 cannot turn faster than it would in the high speed range thus providing a safe condition at all times.

According to another feature means are provided for the driver to vary the predetermined speed at which shifting occurs. Tooth clutch member 51 is provided with a groove 55. Any force applied to the groove to the left will add collective force to spring 52, therefore increase the predetermined speed, while any force applied to groove 55 to the right will detract from the effect of spring 52 and therefore lower the predetermined speed. This force on groove 55 may be applied by a yoke 55a shown in Figure 2 carried by a pivot shaft 56 which is connected to a lever arm 58 by a lost motion connection 57. A spring detent 59 tends to hold the lever 58 in any one of three positions as described hereinafter. Slipper type bearing blocks are shown at 60 carried by the yoke 55a to engage the groove 55.

Another feature is illustrated in Figures 3 and 4 in the form of special shapes for the teeth of tooth clutch 51 and members which it engages. In the case of 51 engaging gear 45 relative motion therebetween might exist in the form of 51 overrunning 45. So that no tooth clatter will take place, should this happen, the ends of the teeth are provided with a slight non-entrance angle for such relative movement. As still further improvement, these teeth may be provided with a slight ejection angle on their low pressure or overrunning contact faces. If these angles are proportioned such that their ejection tendency is just sufficient to overcome the frictional resistance of the splines and the teeth themselves, a prompt disengagement of tooth clutch member 51 is assured upon torque reversal above the predetermined speed. This angle also precludes a strained loading condition of the clutch teeth due to internal stresses set up at times when the one way clutch 49 is carrying the driving load. Should teeth with rectangular faces become engaged under this loaded condition, a material tooth load might be retained after the driving torque has been relieved, thus retarding the desired shifting. But with the proposed ejection angle the sticking tendency due to this internal loading is neutralized. Referring to Figure 4, the teeth to the left indicate the teeth on the right end of part 51, whereas the teeth to the right represent the teeth existing on the clutch member of gear 46, in which angle $\theta$ indicates the previously referred to non entrance angle, angle B represents the ejection angle, angle $\alpha$ represents the angle of the driving side of tooth, this angle might be 90° or slightly greater. There is so little difference between Figures 3 and 4, it is felt that the foregoing description will answer for both figures and that the description of the two is interchangeable, except that tooth clutch member 51 might tend to overrun the clutch teeth of 46 in the opposite direction as indicated by the two arrows directly under the numerals 51a and 51b.

In operation, torque is delivered to spline shaft 38 and revolves gears 40 and 47 mounted thereon. Gear 40 is constantly in mesh with gear 41 and gear 47 is constantly in mesh with gear 46. In the low range, torque from shaft 38, passes through gears 40 and 41 to one way clutch 49 to drive shaft 50 or it may pass from gear 41 through the clutch teeth thereof into clutch tooth member 41, which is splined to shaft 50. As higher speeds are reached, weights 53 are expanded by centrifugal force causing a spreading action, working against spring 52. When the clutch teeth of gears 45 and 51 are unloaded and the predetermined speed exceeded, clutch member 51 shifts to the right. If the gear 46 is turning faster than clutch member 51, the non-entrance angle will gently repulse the advance of teeth 51 but will permit their engagement as soon as the gear 46 is retarded, sufficient to cause synchronization. Prior to engagement, the speed of gear 46 is governed by speed of gear 47, which may be retarded, by lifting the foot from the accelerator. After engagement torque is transmitted from shaft 38 through gears 47 and 46 to tooth clutch member 51 and thence to shaft 50. Upon the reduction of speed, tooth clutch member 51 stands ready to shift to the left to engage the clutch teeth of gear 45. The shift will take place upon the unloading of torque members if and provided a speed below the predetermined speed has been reached. The force which shifts member 51 to the left is secured from spring 52 which overpowers the centrifugal force of weights 53, at such speeds.

Attention is called to the fact that in the embodiment of Figure 1 the output shaft 50 lies below the center line of the engine crank shaft 14.

Referring now to Figure 5, there is shown a transmission in which the output shaft 150 lies in line with the engine crank shaft or driving shaft. This transmission embodies features similar but differently arranged to those just described pertaining to Figure 1, therefore so far as it is consistent, like parts will bear like numbers increased by 100. In this transmission shown in Figure 5 three variable speeds forward and one in reverse are provided, and these become variable ranges when this gear box is used with a hydraulic torque converter. However, it is entirely possible to use this transmission with a conventional clutch, in which case, three speeds forward and one in reverse are to be had and changes in the forward speeds attained automatically. No control means are shown all of which may be contained in a side cover located on the side which is removed, therefore not seen in the illustration. Shaft 70 is a jack shaft, roller bearings 72 are conventional roller bearings supporting gears 146 and 147, and a clutch member 151a similar to clutch 151 is provided on the shaft 138 to connect gears 147 and 147a thereto. Otherwise the parts herein are similar to those shown in Figure 1.

In operation, gear 140 may be in contact with gear 145 during all forward speed ranges but may be shifted into contact with gear 142 for reverse or may be shifted between the two for neutral. During the first, or lowest range, torque passes from shaft 138 to gears 140 and 145 into shaft 70 through one way clutch 149 or the clutch teeth of the gear 145 and clutch member 151 which is splined to shaft 70; thence through gears 71 and 147a. Gear 147a is formed integral with the driven shaft 150.

At this time gear 146 turns idly on its bearing 72. When a predetermined speed has been reached tooth clutch member 151 shifts to the right as previously described, engaging the clutch teeth of gear 146. Torque now passes from shaft 138 through tooth clutch member 151a into gears 147 and 146, through tooth clutch member 151 to turn shaft 70 and gears 71 and 147a, thus furnishing the second or intermediate torque range. When a higher predetermined speed has been reached, clutch member 156a shifts to the right releasing gear 147 and engaging gear 147a. Now torque passes from shaft 138 through clutch member 156a to turn gear 147a and driven shaft 150 forming the direct or high speed range. During this time, gear 147 is free to revolve on its shaft and one way clutch 149 permits shaft 70 to turn faster than gear 145. One way clutches 148 and 149 function substantially the same as oneway clutches 48 and 49 previously described.

Having thus described my invention, it will be seen that it may take other forms and it is not intended to limit the scope of the invention to the exact forms shown nor otherwise than by the terms of the appended claims.

What is claimed is:

1. In a transmission, a shaft, a pair of gears mounted on said shaft for rotation relatively thereto, means for driving said gears at different speeds, a shiftable member splined on the shaft and engageable with said gears to connect one or the other of the gears to the shaft, resilient means for urging the shiftable means into engagement with one of said gears, means responsive to the speed of the shaft for shifting said shiftable means into engagement with the other of said gears, and oppositely acting one-way clutches connecting said gears to the shaft.

2. In a transmission, a shaft adapted to be driven by a source of power and having a pair of spaced driving gears thereon, a shaft to be driven spaced from and parallel to the first named shaft, a pair of gears on the driven shaft rotatable relatively thereto and meshing with the driving gears respectively, shiftable clutch means on the driven shaft for alternatively connecting the last named gears thereto, and oppositely acting one way clutches connecting the last named gears to the driven shaft for synchronizing their speed therewith in opposite directions during shifting and for providing a driving connection through the transmission regardless of the position of the shiftable clutch means.

3. A transmission mechanism comprising a driving shaft, an intermediate shaft and a driven shaft, a gear on the driven shaft, a pair of spaced gears on the driving shaft one of which is drivably connected thereto, a pair of gears on the intermediate shaft rotatable relative thereto and meshing with said gears on the driving shaft, a one-way clutch connecting the intermediate shaft to the gear thereon which meshes with the gear connected to the driving shaft to prevent said gear from turning forward faster than the intermediate shaft, shiftable clutch means for alternatively connecting said last named gears to the intermediate shaft, and shiftable means for alternatively connecting the other gear on the driving shaft thereto or for connecting the driving and driven shafts directly and a one-way clutch connecting the driving and driven shafts to prevent the driven shaft from overrunning the driving shaft.

4. A transmission mechanism comprising a driving shaft, an intermediate shaft and a driven shaft, a gear on the driven shaft, a pair of spaced gears on the driving shaft one of which is drivably connected thereto, a pair of gears on the intermediate shaft rotatable relative thereto and meshing with said gears on the driving shaft, a one-way clutch connecting the intermediate shaft to the gear thereon which meshes with the gear connected to the driving shaft to prevent said gear from turning forward faster than the intermediate shaft, clutch means shiftable in response to the speed of the intermediate shaft for alternatively connecting said last named gears to the intermediate shaft, and means shiftable in response to the speed of the driving shaft for alternatively connecting the other gear on the driving shaft thereto or for connecting the driving and driven shafts directly and a one-way clutch connecting the driving and driven shafts to prevent the driven shaft from overrunning the driving shaft.

5. In a transmission, a driving shaft having a pair of driving gears thereon, a driven shaft, a pair of gears mounted on said driven shaft for rotation relative thereto and meshing respectively with the driving gears, a shiftable member splined on the driven shaft and engageable with said gears thereon to connect one or the other of the gears to the shaft to drive the driven shaft at different speeds, resilient means for urging the shiftable member into engagement with one of the gears on the driven shaft, a collar fixed on the driven shaft, facing cam surfaces on the shiftable member and the collar converging outwardly of the driven shaft, a plurality of weights between the cam surfaces movable in response to centrifugal force to urge the shiftable member into engagement with the other gear on the driven shaft and resilient means urging the weights inwardly.

6. A transmission comprising driving shaft and a driven shaft, a low speed driving gear on the driving shaft, a low speed driven gear on the driven shaft, one of said gears being connected to its shaft by one-way clutch so as to be free to turn in one direction relative to its shaft and caused to grip said shaft in the opposite direction to transmit full torque, tooth clutch means to connect a driving member to a driven member, said clutch teeth provided with ejection angles on their parallel faces, thus to eject engagement prior to synchronization and yieldable means to urge said tooth clutch members into and out of engagement, comprising a spring in one direction and a centrifugal actuator in the other direction located about the shaft and between the gears to urge clutch teeth into engagement at predetermined times and a second one-way clutch of an infinite angular position type to limit the rate at which the driven shaft may overrun the driving shaft in the forwardly direction, thus to prevent free coasting and to synchronize the said tooth clutch means but not necessarily to cause said teeth to register.

7. In a transmission a driving shaft having a pair of driving gears thereon, a driven shaft, a pair of gears mounted on said driven shaft for rotation relative thereto, one-way clutches to lock said gears to said driven shaft in opposite directions of rotation, said gears meshing respectively with the driving gears, and a self contained unit including a shiftable member splined on the driven shaft and engageable with said gears thereon to connect one or the other of the gears to the shaft to drive the driven shaft at different speeds, resilient means to urge the shiftable member into engagement with one of said gears on the driven shaft, a collar fixed on the driven shaft, the collar and shiftable member having facing cam surfaces converging outwardly, and a plurality of weights between the cam surfaces and movable in response to centrifugal force to urge the shiftable member into engagement with the other gear on the driven shaft.

8. A drive shaft, a driven shaft in line therewith, a lay shaft parallel thereto, tooth clutch means to connect the driving shaft directly to the driven shaft to effect a 1:1 drive, the clutch teeth being provided with ejection angles on their parallel faces to eject engagement prior to synchronization, a chain of gears including gears on the driving, driven and lay shafts to transmit motion from the driving shaft to the lay shaft and from the lay shaft to the driven shaft at speeds other than 1:1, one of the driven gears in said chain being mounted on its shaft by a combined roller bearing and one-way clutch, gripping at an infinite number of positions between said gear and its shaft to transmit full torque in the forwardly direction when the driving torque is passing through said gear but free to overrun when the driven shaft is turning at a speed greater than the speed at which said gear chain is capable of driving it, and a second one-way clutch connecting the driving and driven shafts and normally overrunning in the forwardly direction when the driving shaft is driving the driven shaft, the second one-way clutch becoming engaged on occasions when the driven shaft tends to drive the driving shaft to prevent free coasting and to synchronize the tooth clutch means.

ADIEL Y. DODGE.